United States Patent [19]

Vartanian et al.

[11] 4,179,271
[45] Dec. 18, 1979

[54] AMINE OXIDE POLYMERS AND USE THEREOF AS FUEL DETERGENT

[75] Inventors: Paul F. Vartanian, Wappingers Falls; Anthony L. Ippolito, Beacon, both of N.Y.

[73] Assignee: Texaco Inc., White Plains, N.Y.

[21] Appl. No.: 860,547

[22] Filed: Dec. 14, 1977

[51] Int. Cl.$^2$ .............................................. C10L 1/18
[52] U.S. Cl. ....................................................... 44/62
[58] Field of Search ...................... 44/62, 70; 260/895; 526/56, 57

[56] References Cited

U.S. PATENT DOCUMENTS

| | | | |
|---|---|---|---|
| 2,737,452 | 6/1956 | Catlin et al. .............................. 44/62 |
| 2,805,925 | 9/1957 | Biswell ..................................... 44/62 |
| 3,445,403 | 5/1969 | Tucker et al. .......................... 526/56 |
| 3,664,990 | 5/1972 | Slagel .................................... 260/895 |
| 3,934,595 | 1/1976 | Dermain et al. ....................... 526/56 |
| 3,981,846 | 9/1976 | Freytag et al. ......................... 526/57 |
| 3,991,109 | 11/1976 | D'Angelo et al. ...................... 526/57 |
| 4,039,634 | 8/1977 | Couchoud ............................. 260/895 |

Primary Examiner—Winston A. Douglas
Assistant Examiner—Y. Harris-Smith
Attorney, Agent, or Firm—Thomas H. Whaley; Carl G. Ries; James J. O'Loughlin

[57] ABSTRACT

As a fuel additive, the oxidation product of a polymer having an amine group. Also disclosed herein is a fuel component, especially gasoline, containing such an amine oxide polymer as a detergent.

4 Claims, No Drawings

AMINE OXIDE POLYMERS AND USE THEREOF AS FUEL DETERGENT

BACKGROUND OF THE INVENTION

1. Field of the Invention

This invention relates to an amino nitrogen-containing polymer and its use as a detergent in a fuel, especially gasoline, to remove build-up of deposits upon an automotive carburetor and/or inhibit accumulation of such build-up on such carburetor. More especially, this invention relates to amine oxide-containing polymers and their use as carburetor detergents. This invention further relates to the reaction product of a polymer having an amine group, especially a tertiary amine group, with an oxidizing agent and the use of the resultant product as a detergent for fuels, especially gasoline.

2. Discussion of the Prior Art

Various detergents have been proposed for use in fuels, especially gasoline. For instance, it has heretofore been proposed to employ as a gasoline detergent a condensation product of a secondary $C_{10}$ amine with maleic anhydride. Similarly, it has been proposed to use an amine of polyisocyanate detergent. Both of these known types of gasoline detergents are effective in removing deposit build-up from an automotive engine carburetor. However, the known commercially available types of gasoline detergents are particularly costly in production, thus adding to the final cost of gasoline at the pump.

It has become desirable, therefore, to provide less expensive, yet effective, gasoline detergents. It has heretofore been proposed by Catlin et al in U.S. Pat. No. 2,737,452 to employ as a fuel oil stabilizer at least 0.001 percent by weight of an oil soluble basic amino nitrogen-containing addition type polymer of a plurality of polymerizable ethylinically unsaturated compounds, at least one of which is amine-free and contains about 18 carbon atoms in an aliphatic hydrocarbon chain which, while in the polymer, is not part of the main polymer chain. The polymer also contains units which supply a basic amino nitrogen in a side chain, the polymer containing 0.1 to 3.5 percent by weight of basic amino nitrogen. The basic amino nitrogen is supplied by a compound such as β-diethylaminoethyl methacrylate. Such stabilizers are effective in stabilizing catalytically cracked fuel oils. They possess some degree of detergency.

It has become desirable to provide more effective and different gasoline detergents. More especially, it has become desirable to provide more effective detergents which are polymeric in nature and are derived from both nitrogen-containing and nitrogen-free comonomers.

SUMMARY OF THE INVENTION

The objects of this invention are provided by the oxidation product of a polymer having an amine group with an oxidizing agent.

It has been discovered, in accordance with the invention, that by oxidizing a polymer having an amine group that there is provided an amine oxide reaction product which is especially effective as a gasoline detergent.

The polymers which are reacted in accordance with the present invention are of the type disclosed by Catlin et al, U.S. Pat. No. 2,737,452, the disclosure of which is hereby specifically incorporated herein by reference. In accordance with the present invention, by reacting such known copolymers with an oxidizing agent, there is formed an amine oxide which is especially effective, when employed as a gasoline detergent, in removing deposits from an automotive carburetor and, perhaps more significantly, in inhibiting deposit build-up upon such an automotive carburetor. Particularly preferred amine oxides of the invention are amine oxides of primary, secondary, and tertiary amino nitrogen-containing polymers, especially amine oxides of polymers containing a tertiary amino nitrogen atom.

The invention can be more readily understood and appreciated when reference is made to the equation set forth below, showing what is believed to occur when a polymer containing an amino nitrogen group reacts with an oxidizing agent in accordance with the invention.

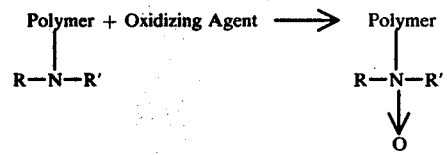

In the formula, R and R' can independently be hydrogen or an organic moiety, as more fully discussed below. The gist of the invention lies in converting the substituted or unsubstituted amino group of the polymer to the corresponding amine oxide.

The invention can perhaps still better be appreciated when reference is made to the further equation showing the conversion of a particularly desirable polymer to its corresponding amine oxide.

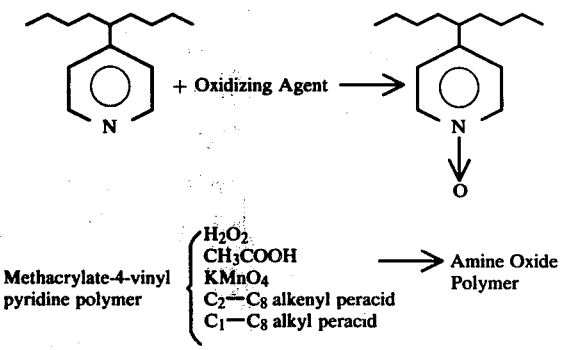

In the polymer above, the amine group is supplied employing, as a comonomer of the copolymer, 4-vinylpyridine. It is seen that the nitrogen atom of the pyridine component is oxidized to form the corresponding amine oxide polymer.

With respect to the polymers which are reacted in accordance with the present invention, it is preferred that the polymer have a tertiary nitrogen atom. It is particularly contemplated to react an oxidizing agent with a polymer which itself is the olefin polymerization product of:

A) a nitrogen amine free ester of a $C_1$-$C_6$ olefinically unsaturated aliphatic mono-, di- or poly-carboxylic acid; and B) an olefinically unsaturated comonomer containing a basic nitrogen atom in a side chain, especially a tertiary nitrogen atom.

The reaction product can be described generically as having the following formula

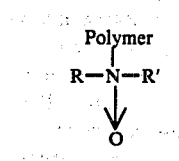

In the formula, R and R' independently represent hydrogen, alkyl, alkenyl, aralkyl, alkynyl, aryl, heterocyclic, cycloalkyl and alicyclic. When R or R' represent alkyl, they preferably represent an alkyl group of up to 8 carbon atoms, especially an alkyl group of 1 to 4 carbon atoms. Particularly contemplated alkyl groups are methyl, ethyl, n-propyl, isopropyl, butyl and isobutyl. Where R or R' represent alkenyl, they preferably have between 2 and 6 carbon atoms in the chain, especially 2 to 4 carbon atoms in the chain. When R or R' represent aralkyl, they preferably contain 6 carbocyclic carbon atoms in the aryl portion and up to 8 carbon atoms in the alkyl portion. Alkynyl groups which are particularly contemplated for R or R' are those alkynyl groups having up to 6 carbon atoms. Aryl groups contemplated are, in particular, those containing from 6 to 18 carbocyclic carbon atoms. Particularly contemplated aryl groups are phenyl, biphenyl and naphthyl. Heterocyclic groups contemplated include particularly those heterocyclic groups having between 4 and 7 carbocyclic carbon atoms in the ring where the hetero group is oxygen, sulfur or nitrogen. Cycloalkyl groups particularly contemplated are those containing between 4 and 8 carbon atoms in the ring. It should be noted additionally that R and R' can be taken together with the nitrogen atoms to form a heterocyclic ring which can be saturated or unsaturated and preferably has between 4 and 7 carbocyclic carbon atoms in the ring.

The amine oxide polymers are prepared by contacting the basic polymer with an oxidizing agent at a temperature in the range of between 50° and 200° C., preferably 70 to 100° C. The reaction can be conducted at sub-atmospheric pressure, atmospheric pressure, or super-atmospheric pressure. Generally speaking, the reaction is conducted from a sub-atmospheric pressure of about 700 Torr up to a pressure of about 10 bar. While solvents can be employed, solvents are unnecessary for the reaction. Solvents which can be utilized include: ethers, especially the dimethyl ether of diethylene glycol, and polar solvents including, in particular, dimethyl formamide and dimethyl sulfoxide.

Generally speaking, the reaction is carried out using an excess of oxidizing agent. Normally, the mol ratio of oxidizing agent to polymer will be in the ratio of 1–3:1, preferably 1.5 to 2.5:1.

Oxidation catalysts are unnecessary. However, if desired, an oxidation catalyst can be employed to facilitate the reaction. Particularly contemplated oxidation catalysts include: metal oxides such as copper oxide or silver oxide.

The reaction is carried out until virtually all of the amino nitrogen atoms have been oxidized. Generally speaking, the reaction is carried out for a period of 10–30 hours, preferably 15–20 hours.

Oxidizing agents contemplated include, in particular, molecular oxygen and compounds which supply oxygen. It is preferred to employ compounds which supply oxygen including, in particular, hydrogen peroxide, acetic acid, potassium permanganate, $C_2$–$C_8$ alkenyl peracids and $C_2$–$C_8$ alkyl peracids, especially perpropionic acid.

With respect to the copolymer, the copolymer is preferably one prepared in accordance with copending application No. Ser. No. 847,643, entitled *Use of Nitrogen Containing Polymers Prepared from Methacrylic Esters as Carburetor Detergents and Corrosion Inhibitors*, assigned to the assignee hereof, of Messrs. Cusano, Rubin, Jones, and Vartanian, the disclosure of which is hereby incorporated herein by reference. The copolymer thereof comprises:

($A_1$) a $C_1$–$C_6$ saturated or unsaturated, substituted or unsubstituted, aliphatic or aromatic ester of an unsaturated, aliphatic, mono-, di-, or polycarboxylic acid of $C_1$–$C_6$ chain length in amounts of between 5 and 30 weight percent and most preferably 15 to 25 weight percent, based upon the weight of the copolymer; and ($A_2$) a $C_8$–$C_{20}$ saturated or unsaturated, substituted or unsubstituted, aliphatic or aromatic ester of an unsaturated mono-, di- or polycarboxylic acid of $C_1$–$C_6$ chain length in the amount of 50 to 81 weight percent based upon the weight of the copolymer. The balance of the copolymer is preferably made up of amino nitrogen containing compounds having a tertiary nitrogen atom. They are present in an amount of 4 to 20 weight percent, preferably 7 to 20 weight percent.

The esters are preferably esters of acids such as methacrylic, acrylic, fumaric, maleic or butenic acid. Where substituents are present on the ester group, said substituents can be halogen, cyano, hydroxyl, mercapto, or acetyl, it being understood that the amount of halogen or sulfur in the detergent is limited by upper limits for their content. Such preferred copolymer has a molecular weight determined by vapor phase osmometry of between 500 and 5,000.

The copolymer which is oxidized to form the amine oxide in accordance with the invention can be prepared by conventional bulk solution or dispersion polymerization methods involving known initators including oxygen-yielding compounds such as benzoyl peroxide, di-tert.-butyl peroxide and azo initiators such as azobisisobutyronitrile. The polymers can be prepared in solution or neat.

Preferably, with respect to component $A_2$ supra, the same is, in turn, made up of a mixture of $C_{16}$–$C_{20}$ esters of $C_1$–$C_6$ aliphatic carboxylic acid and $C_{12}$–$C_{15}$ esters of aliphatic carboxylic acids. Thus, in turn, component $A_2$ preferably comprises:

($A_{2a}$) between 10 and 25 percent, especially 15 to 20 percent by weight, based upon the weight of the copolymer, of $C_{16}$–$C_{20}$ esters of a $C_1$–$C_6$ olefinically unsaturated aliphatic mono-, di- or polycarboxylic acid; and ($A_{2b}$) 40 to 60 weight percent, preferably 50 to 55 weight percent, based upon the weight of the copolymer, of $C_{12}$–$C_{15}$ esters of a $C_1$–$C_6$ olefinically unsaturated aliphatic mono-, di- or polycarboxylic acid.

The ester group itself is preferably an alkyl group, but can also be another group such as alkenyl, alkynyl, alicyclic, cycloalkyl, aralkyl and the like. Thus, the ester group can be both saturated and unsaturated and can contain oxygen or sulfur in the chain.

The esters used to form the copolymer are preferably both short chain esters, in accordance with component $A_1$, and long chain esters, in accordance with component $A_2$. It is to be understood that the esters of components $A_1$ and $A_2$ can be esters of the same or different carboxylic acid.

With respect to the olefinically unsaturated copolymer containing the basic amino nitrogen in the side chain, a wide variety of compounds are usable therefor. These compounds include tertiary amines which can be supplied by a wide variety of aliphatic, heterocyclic and aromatic compounds. Particularly contemplated amines are compounds such as p-($\beta$-diethylaminoethyl) styrene, basic nitrogen-containing heterocyclics where the nitrogen atom is bonded to three organic moieties and the compound contains a polymerizable ethylenically unsaturated substituent. The vinyl pyridines are examples of such compounds. Also contemplated are tertiary amines such as esters of basic amino compounds with unsaturated carboxylic acids such as the alkyl- and cycloalkyl-substituted amino alkyl and cycloalkyl esters of the acrylic and alkylacrylic acids, e.g., the dialkylaminoalkyl acrylates and alkylacrylates of which 4-diethylaminocyclohexyl-methacrylate is an example. Also contemplated are unsaturated ethers of basic amino alcohols, such as the vinyl ethers of such alcohols, including $\beta$-diethylaminoethyl vinyl ether. Amides of unsaturated carboxylic acids wherein a basic amino substituent is carried on the amide nitrogen are also contemplated, such as N-($\beta$-dimethylaminoethyl) acrylamide, polymerizable, unsaturated basic amines, e.g., diallyl amine and the like.

The polymerization to form the basic copolymer is usually carried out in an inert atmosphere such as nitrogen or carbon dioxide at temperatures ranging from 30 to 150° C., depending upon the catalyst used, and generally at temperatures between 50 and 70° C. when an $\alpha$-$\alpha'$-azodiisobutyronitrile is employed as catalyst. It is important to carry out the copolymerization to such an extent that very little original monomer remains with the polymeric product.

The amine oxide polymer of this invention is especially useful in a fuel as a detergent. It is particularly contemplated for use in gasoline, where it not only removes deposits from an engine carburetor, but actually prevents deposit build-up on the components of such carburetor. Generally speaking, the detergent is present in the fuel in an amount of between 0.005 and 1 weight percent, preferably 0.05 to 0.75 weight percent.

In order to more fully illustrate the nature of the invention and the manner of practicing the same, the following examples are presented:

EXAMPLES

EXAMPLE 1

A nitrogen-containing polymer prepared from 4vinyl-pyridine, butylmethacrylate and a mixture of long chained esters of methacrylic acid was prepared by the following technique:

Into a one liter resin kettle fitted with external heating, thermometer, nitrogen inlet, stirrer and condenser, there was charged 54.5 percent by weight of Neodol 25L methacrylate (a $C_{12}$-$C_{15}$ side chain ester of methacrylic acid having an average chain length of 13.6 carbon atoms), 16.5 weight percent of Alfol 1620 methacrylate (a $C_{16}$-$C_{20}$ side chain ester of methacrylic acid having an average ester chain length of 17.1 carbon atoms), 20 percent by weight butylmethacrylate and 9 percent by weight 4-vinylpyridine. The reactants were admixed with n-dodecylmercaptan and heated to 95° C. under a nitrogen blanket in the presence of azobisisobutyronitrile as polymerization initiator. Polymerization was permitted to continue until the polymerization was substantially complete. The polymerization was effected for a period of about six hours at 95° to 100° C.

PREPARATION OF AMINE OXIDE POLYMER

EXAMPLE 1(a)

A mixture of 100 grams of a polymer having a molecular weight of 2600 prepared in accordance with the procedure set forth above, 40 grams of acetic acid and 30 ml of 30 percent hydrogen peroxide were stirred together at 70° C. for 20 hours. At the end of the heating time, the acetic acid and peroxide were removed by reduced pressure distillation to yield an amine oxide product.

EXAMPLE 2

In a procedure analagous to Example 1, a polymer having a molecular weight of 2900 was prepared from 20 weight percent butylmethacrylate, 54.5 percent Neodol 25L methacrylate, 16.5 percent Alfol 1620 methacrylate and 9 percent dimethylaminoethyl methacrylate.

EXAMPLE 2(a)

150 grams of the polymer of Example 2 were mixed with 60 grams of acetic acid and 30 ml of 30 weight percent hydrogen peroxide and stirred together at 75° C. for 20 hours. The acetic acid and peroxide were removed by reduced pressure distillation to yield the amine oxide product.

In order to evaluate the ability of the amine oxide polymer to remove deposits from a carburetor, a Chevrolet Carburetor Detergency Test, Phase III, was performed. According to this test, a running Chevrolet V-8 engine mounted on a test stand and fitted with a modified 4-barrel carburetor is employed. The two secondary barrels of the carburetor are sealed and the feed to each of the primary barrels is arranged so that detergent additive fuel can run in one barrel and reference fuel can run in the other. The primary carburetor barrels are also modified to contain removable aluminum inserts in the throttle plate area so that deposits adhering to the inserts can be conveniently weighed.

The engine is run for a period of time, usually 24 to 48 hours, using a base fuel as the feed to both carburetor barrels with engine blowby circulated to the carburetor air inlet. The weight of the deposits thus formed is measured and recorded. Upon completion of the test cycle, the inserts are removed from the carburetor and weighed to determine the difference between the performances of the test additive vis-a-vis the base fuel. After the aluminum inserts have been cleaned and replaced in the carburetor, the process is repeated with the fuel feeds to the carburetor in the test cycle reversed to minimize any differences in fuel distribution or carburetor construction. The results obtained in two runs are averaged and the effectiveness of the additive fuel in removing deposits is expressed in percent. Set forth below are the values obtained using an amine oxide copolymer in accordance with the invention vis-a-vis the basic polymer in the non-oxide form.

| | CHEVROLET CARBURETOR DETERGENCY TEST, PHASE III | | |
|---|---|---|---|
| Additive 100 | Deposit, mg. | | Effectiveness, |
| PTB$^a$ Conc. | Build-up | Removal | Percent |
| Example 1 (non-oxide) | 18.8 | 13.4 | 71 |

CHEVROLET CARBURETOR DETERGENCY TEST, PHASE III -continued

| Additive 100 PTB[a] Conc. | Deposit, mg. Build-up | Deposit, mg. Removal | Effectiveness, Percent |
|---|---|---|---|
| Example 1(a) 9% 4-vinyl-pyridine | 23.3 | 16.4 | 70 |
| Example 2 (non-oxide) | 19.0 | 12.5 | 66 |
| Example 2(a) 9% DMAEMA[b] | 27.5 | 21.6 | 79 |

[a]PTB equals pounds per thousand barrels additive and refers to the concentration of detergent of Examples 1 and 2.
[b]DMAEMA equals dimethylaminoethyl methacrylate.

In order to determine the ability of the amine oxide polymer of the invention to prevent deposit build-up on the components of an automotive carburetor, a Buick Carburetor Detergency Test was conducted and the results compared with the results obtained using the same polymer in a non-oxide form. The test was conducted using the 1973 Buick Carburetor Detergency Test which measures the ability of the detergent to prevent deposit build-up on an initially clean carburetor. The test uses the 1973 Buick 350 CID V-8 engine equipped with a 2-barrel carburetor. The engine was mounted on a dynamometer test stand and had operating and exhaust gas return, an air induction reactor and a positive crankcase ventilator. The test cycle, shown in Table I, is representative of normal road conditions. Approximately 300 gallons of fuel and three quarts of oil were required for each run.

Prior to each run, the carburetor was completely reconditioned. Upon completion of the run, the throttle plate deposits were rated visually according to a merit rating scale of 1 to 10 with "1" applied to extremely heavy deposits on the throttle and "10" to a completely clean plate. The test was conducted under various stages, Stage I, Stage II, and Stage III, representing different engine operating conditions insofar as engine speed, torque, duration, and the like. Thus, the test was conducted by initially running the engine at 650±25 r.p.m. for one hour followed by three hours at 1500±25 at 80±2 foot pounds torque followed by one hour at 2000±25 at 108±2 foot pounds torque. The cycles were repeated in such order for a total of 120 hours.

TABLE I
1973 BUICK CARBURETOR DETERGENCY TEST OPERATING CONDITIONS

| | Stage I | Stage II | Stage III |
|---|---|---|---|
| Duration - hours | 1 | 3 | 1 |
| Speed, r.p.m. | 650 ± 25 | 1500 ± 25 | 2000 ± 25 |
| Torque, foot pounds | 0 | 80 ± 2 | 108 ± 2 |
| Water out, °F. | 205 ± 5 | 205 ± 5 | 205 ± 5 |
| Carburetor Air, °F. | 140 ± 5 | 140 ± 5 | 140 ± 5 |
| Exhaust Back Pressure, in. Hg. | — | 0.7 ± 0.1 | |
| Man. Vac., in. Hg. | — | 15.8 | 14.2 |
| Fuel flow, pounds per hour | 0.7 | 7.5 | 12.0 |
| Test duration, 120 hours. | | | |

The amine oxide polymer was evaluated against the same polymer which had not been formed into an amine oxide. The results are set forth in the table below:

TABLE II
BUICK TEST DATA

| Fuel | Dosages (PTB)[a] | Rating |
|---|---|---|
| Basic Fuel (without additive) | — | 3.0 |
| Example 1 (non-oxide) | 100 | 3.4 |
| Example 1 (oxide) | 50 | 4.7 |
| | 70 | 6.3 |
| | 90 | 7.4 |

[a]PTB = pounds per thousand barrels.

It is evident from the data above that the amine oxide polymer of the invention is far more effective in preventing deposit build-up on the components of an automotive carburetor than the corresponding polymer in a non-oxide form. In fact, the amine oxide polymer of the invention is more than twice as effective as the non-oxide form of the same polymer.

In order to further demonstrate the ability of the amine oxide polymer of the invention to provide corrosion protection, the same was tested in accordance with the Colonial Pipeline Rust Test. In this test (similar to ASTM D-665 procedure), 300 ml of additive fuel and 30 ml of water are stirred at 100° C. in the presence of a polished steel spindle for three and one-half hours. At the end of the time period, the steel spindle is visually examined for signs of rust, with the ratings expressed in percent of area covered by rust. Set forth below are the ratings obtained with the polymers of Examples 1 and 2 of the invention vis-a-vis the non-oxide version of the polymers.

TABLE III
COLONIAL PIPELINE RUST TEST[a]

| Additive | Dosage, PTB[b] | Rating |
|---|---|---|
| None | — | 50–100 |
| Example 1 | 25 | 1–5 |
| Example 1 | 5 | 1–5 |
| Example 1 (non-oxide) | 100 | T–1 |
| Example 1 (non-oxide) | 50 | 1–5 |
| Example 1 (non-oxide) | 25 | 1–5 |
| Example 2 | 25 | 1–5 |
| Example 2 | 5 | 1–5 |
| Example 2 (non-oxide) | 200 | 50–100 |

[a]Similar to ASTM D-665 test.
[b]PTB = pounds per thousand barrels.

It is evident from the data above that the polymers of the invention are far more effective in inhibiting the formation of rust.

From the foregoing, it is evident that the polymers of the present invention are superior to the non-oxide polymers in removing deposit build-up from an automotive carburetor and in preventing deposit-build-up of an initially clean automotive carburetor.

What is claimed is:

1. A motor fuel composition comprising a gasoline base fuel and from 0.005 to 1 weight percent of a detergent reaction product where said detergent reaction product is obtained by preparing an initial reaction mixture consisting of from 5 to 30 weight percent of a butyl methacrylate, 50 to 81 weight percent of a higher ester of methacrylic acid consisting of between 10 and 25% by weight of $C_{16}$–$C_{20}$ esters of methacrylic acid and 40 to 60 weight percent of a $C_{12}$–$C_{15}$ aliphatic ester of methacrylic acid, from 4 to 20 weight percent of a nitrogen containing compound selected from the group consisting of 4-vinyl-pyridine and dimethylaminoethyl methacrylate and reacting said initial mixture in the presence of a polymerization catalyst and polymerization initiator to produce a first reaction product, admixing said first reaction product with an oxidizing agent selected from the group consisting of hydrogen peroxide, potassium permanganate, acetic acid, $C_2$-$C_8$ alkenyl peracid and $C_1$-$C_8$ alkyl peracid to form a second reaction mixture and reacting said second reaction mixture at a temperature ranging from 50° to 200° C. to form said detergent reaction product.

2. A motor fuel composition according to claim 1 in which said initial reaction mixture consists of 10 to 30 percent butyl methacrylate, 60 to 75 percent said higher ester of methacrylic acid and from 7 to 20 percent of said nitrogen-containing compound.

3. A motor fuel composition according to claim 1 containing from about 0.05 to 0.75 weight percent of said reaction product.

4. A motor fuel composition according to claim 1 in which said polymerization is conducted in the presence of n-dodecylmercapton.

* * * * *